United States Patent
Homan et al.

(10) Patent No.: US 6,667,620 B2
(45) Date of Patent: Dec. 23, 2003

(54) CURRENT-DIRECTING SHIELD APPARATUS FOR USE WITH TRANSVERSE MAGNETIC DIPOLE ANTENNAS

(75) Inventors: Dean M. Homan, Sugar Land, TX (US); Charles Kibbe, Sugar Land, TX (US); Kuo-Chiang Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 12 days.

(21) Appl. No.: 10/113,265

(22) Filed: Mar. 29, 2002

(65) Prior Publication Data

US 2003/0184303 A1 Oct. 2, 2003

(51) Int. Cl.$^7$ ................................................. G01V 3/10
(52) U.S. Cl. ....................................................... 324/339
(58) Field of Search ............................... 324/338, 339, 324/340, 341, 342, 343, 323, 329, 335, 346; 336/84 R, 84 M, 84 C (56) References Cited

U.S. PATENT DOCUMENTS

| | | | |
|---|---|---|---|
| 4,319,191 A | 3/1982 | Meador et al. | |
| 4,511,843 A | 4/1985 | Thoraval | |
| 4,536,714 A | 8/1985 | Clark | |
| 4,538,109 A | * 8/1985 | Clark | ......................... 324/338 |
| 4,808,929 A | * 2/1989 | Oldigs | ......................... 324/339 |
| 5,944,124 A | 8/1999 | Pomerleau et al. | |
| 5,988,300 A | 11/1999 | Pomerleau et al. | |
| 6,084,052 A | 7/2000 | Aufdermarsh et al. | |
| 6,208,031 B1 | 3/2001 | Fraivillig | |
| 6,300,762 B1 | 10/2001 | Thomas, Jr. et al. | |
| 6,351,127 B1 | * 2/2002 | Rosthal et al. | .............. 324/338 |

FOREIGN PATENT DOCUMENTS

GB    2 344 127    5/2000

\* cited by examiner

Primary Examiner—Jay Patidar
Assistant Examiner—Subhash Zaveri
(74) Attorney, Agent, or Firm—Victor H. Segura; Brigitte L. Jeffery; John Ryberg (57) ABSTRACT

Shield apparatus are provided for use with logging instruments equipped with transverse magnetic dipole antennas. Flexible dielectric strips and dielectric cylindrical bodies are implemented with conductive elements in various patterns to form Faraday shield structures. The shields provide an extended conductive surface to the instrument support member and redirect axial currents along the borehole, protecting the underlying antennas from the undesired effects of these currents.

39 Claims, 9 Drawing Sheets

CURRENT-DIRECTING SHIELD APPARATUS FOR USE WITH TRANSVERSE MAGNETIC DIPOLE ANTENNAS

BACKGROUND OF INVENTION

1. Field of the Invention

This invention relates generally to the field of electromagnetic (EM) well logging. More particularly, the invention concerns devices for reducing and/or correcting for the effects of the borehole on an overall subsurface formation measurement.

2. Background Art

Induction and propagation logging techniques have been employed in hydrocarbon and water exploration and production operations for many years to measure the electrical conductivity (or its inverse, resistivity) of subsurface formations. These techniques entail the deployment of antennas into a borehole to emit EM energy through the borehole fluid (also referred to herein as mud) and into the subsurface formations. Conventional logging techniques include "wireline" logging, logging-while-drilling (LWD), and logging-while-tripping (LWT). Wireline logging entails lowering the antennas into the borehole on a "sonde" or support at the end of an electrical cable to obtain the subsurface measurements as the instrument is moved along the borehole. LWD entails mounting the antennas on a support connected to a drilling assembly to obtain the measurements while a borehole is being drilled through the formations. LWT involves placing a support equipped with antennas near the bottom of the drill string and making measurements while the string is withdrawn from the borehole.

Conventional antennas are formed from coils of the cylindrical solenoid type comprised of one or more turns of insulated conductor wire wound around a support. These antennas are typically operable as sources and/or sensors. In operation, a transmitter antenna is energized by an alternating current to emit EM energy. The emitted energy interacts with the mud and the formation, producing signals that are detected and measured by one or more of the antennas. The detected signals are usually expressed as a complex number (phasor voltage) and reflect the interaction with the mud and the formation. By processing the detected signal data, a profile of the formation and/or borehole properties is determined.

A coil carrying a current can be represented as a magnetic dipole having a magnetic moment proportional to the current and the area encompassed by the coil. The direction and strength of the magnetic dipole moment can be represented by a vector perpendicular to the area encompassed by the coil. In conventional induction and propagation logging systems, the antennas are typically mounted on a metallic "sonde" or support with their axes along the longitudinal axis of the support. Thus, these instruments are implemented with antennas having longitudinal magnetic dipoles (LMD). U.S. Pat. No. 4,651,101 describes a logging sonde implemented with LMD antennas. When such an antenna is placed in a borehole and energized to transmit EM energy, currents flow around the antenna in the borehole and in the surrounding formation. There is no net current flow up or down the borehole.

An emerging technique in the field of well logging is the use of instruments incorporating antennas having tilted or transverse coils, i.e., where the coil's axis is not parallel to the support axis. An antenna with its axis perpendicular to the support axis is usually referred to as a transverse antenna. These instruments are thus implemented with antennas having a transverse or tilted magnetic dipole (TMD). One particular implementation uses a set of three coils having non-parallel axes (referred to herein as triaxial). The aim of these TMD configurations is to provide EM measurements with directional sensitivity to the formation properties. Transverse magnetic fields are also useful for the implementation of nuclear magnetic resonance based methods. U.S. Pat. No. 5,602,557, for example, describes an arrangement that has a pair of "saddle-coil" conductor loops lying opposite one another and rotationally offset 90° relative to one another. Other instruments equipped with TMDs are described in U.S. Pat. Nos. 6,163,155, 6,147,496, 5,757,191, 5,115,198, 4,319,191, 5,508,616, 5,757,191, 5,781,436, 6,044,325, 4,264,862 and 6,147,496.

If a transmitter is placed in a homogeneous medium, currents will flow in paths surrounding the transmitter. When a borehole is added, these current paths are distorted. These currents induce a voltage in a receiver displaced from the transmitter. This voltage is an indication of the resistivity of the formation. If instead of a homogeneous medium, we include a borehole, then the current paths are altered and hence the received voltage is different from what would be measured in the absence of a borehole. This difference is called the "borehole effect." The difference in borehole effect between a LMD-based tool and a TMD-based tool is due to the difference between the distortion of the currents in the presence of a borehole.

A particularly troublesome property of the TMD is the extremely large borehole effect that occurs in high contrast situations, i.e., when the mud in the borehole is more conductive than the formation. When a TMD is placed in the center of a borehole, there is no net current along the borehole axis. When it is eccentered in a direction parallel to the direction of the magnetic moment, the symmetry of the situation insures that there is still no net current along the borehole axis. However, when a TMD is eccentered in a direction perpendicular to the direction of the magnetic moment, axial currents are induced in the borehole. In high contrast situations these currents can flow for a very long distance along the borehole. When these currents pass by TMD receivers, they can cause signals that are many times larger than would appear in a homogeneous formation without a borehole, resulting in erroneous measurements.

U.S. Pat. No. 4,319,191 (assigned to the present assignee) describes a sensor assembly aimed at protecting a solenoid from the borehole environment. U.S. Pat. No. 5,041,975 (assigned to the present assignee) describes a technique for processing signal data from well logging measurements in an effort to correct for the effects of the borehole. U.S. Pat. No. 5,058,077 describes a technique for processing downhole sensor data in an effort to compensate for the effect of eccentric rotation on the sensor while drilling. U.S. Pat. No. 5,781,436 describes a technique for measuring the conductivity of earth formations by making subsurface EM measurements at multiple frequencies and preselected amplitudes. However, none of these patents relates to the properties or effects of TMDs in subsurface measurements.

Thus there remains a need for improved methods and apparatus for handling the flow of undesired axial currents along the borehole.

SUMMARY OF THE INVENTION

One aspect of the invention is an apparatus for use with a support adapted for disposal within a borehole. The apparatus comprises a body adapted for disposal on the support, the body having a longitudinal axis, first and second ends, and formed of a dielectric material. At least one electrically conductive element is disposed on the body in alignment with the longitudinal body axis, the element extending from the first end and terminating between the first and second ends. A conductor is coupled to the electrically conductive element to provide a current path between the element and the support.

Another aspect of the invention is an apparatus for use with a support adapted for disposal within a borehole. The apparatus comprises a body adapted for disposal on the support, the body having a longitudinal axis, first and second sides, and formed of a dielectric material. At least one conductor is disposed on the body in alignment with the longitudinal body axis. At least one electrically conductive element is disposed on the body in contact with and intersecting the conductor. The conductive element extends out in opposite directions from the intersection with the conductor and terminates in unconnected ends in each direction; wherein the conductor is adapted to provide a current path between the conductive element and the support.

Another aspect of the invention is an apparatus for use with a support adapted for disposal within a borehole. The apparatus comprises a body adapted for disposal on the support, the body formed of a dielectric material as a hollow open-ended surface of revolution with first and second ends; an electrical conductor is disposed on the body. An electrically conductive element is disposed on the body in alignment with the longitudinal axis of the body, the element being electrically coupled to the conductor and extending toward the first end to terminate unconnected; wherein the conductor is adapted to provide a current path between the element and the support.

BRIEF DESCRIPTION OF THE DRAWINGS

Other aspects and advantages of the invention will be apparent from the following description and upon reference to the drawings in which:

FIG. 7b is a cross-section of the shield body of FIG. 7a.

DETAILED DESCRIPTION

Figure 1:
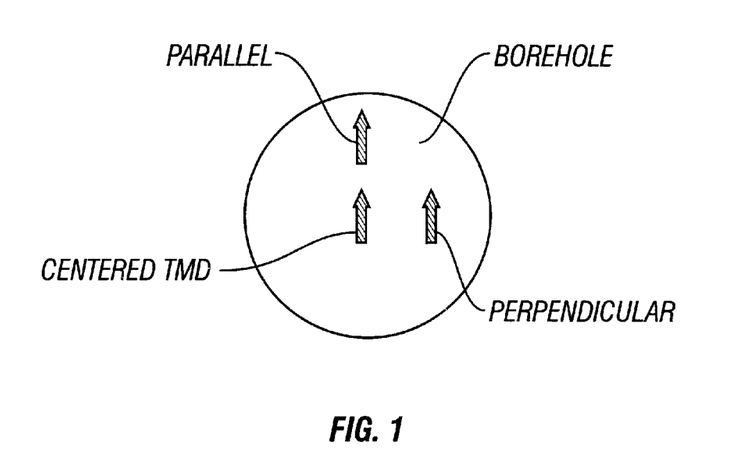
FIG. 1 shows a pictorial; looking downhole of parallel and perpendicular eccentering of a tilted or transverse magnetic dipole within a borehole.

A TMD can be eccentered in a borehole in two possible orientations, which we will call parallel and perpendicular eccentering as shown in FIG. 1. Parallel eccentering forces currents symmetrically up and down the borehole and therefore no net current is generated. This borehole effect is no worse than in a typical instrument equipped with non-tilted (axial) antennas. Perpendicular eccentering gives rise to a large axial borehole current, which can strongly couple to a transverse receiver an axial distance away (shown in FIG. 2a). These two displacements are the extremes of the possible ones. In the general case, the eccentering will be in a direction that is at some angle to the dipole moment of the sensors. In this case, the borehole effect lies between the two extreme cases.

Analysis has shown that in a conductive borehole, the effect of perpendicular eccentricity is at least two orders of magnitude higher than for parallel eccentricity. The cause of that phenomenon is appearance of zeroth order modes $TM_{0n}$, corresponding to the longitudinal (z-directed) current flowing in the borehole.

One approach to minimizing the borehole effect on transmitters and receivers near an eccentered TMD is to short the induced axial current near the TMD transmitter ($TM_{01}$ mode), using an EM transparent or Faraday-type shield in contact with the conductive mud covering the transmitter. A similar Faraday shield may be used to direct currents near a TMD receiver, where the undesired currents coupling to the receiver via a magnetic field are minimized by routing the shorted current perpendicular to the TMD antenna windings, e.g. the saddle-coil windings.

Figure 2A:
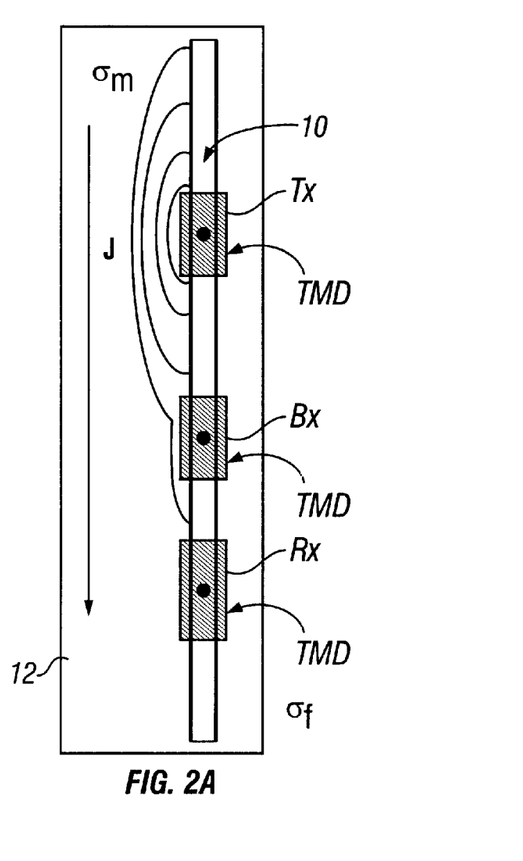
FIG. 2a shows a schematic diagram of a conventional logging instrument equipped with a tilted or transverse magnetic dipole antenna.

FIG. 2a shows a conductive support 10 disposed in a borehole and in contact with the conductive mud 12. The support 10 may be any wireline tool, LWD, LWT, coiled tubing, or other logging tool known in the art. The support includes a TMD transmitter $T_x$, bucking antenna $B_x$, and a receiver $R_x$. The magnetic dipoles are pointing out of the figure. As described above, a magnetic dipole oriented perpendicular to the support axis and transversely eccentered excites a large axial current in the borehole or a $TM_{01}$ mode, which can couple strongly to a similarly oriented receiver. This axial current, labeled by the current density $\vec{J}$, can be shorted locally about the transmitter into the conductive support as shown in FIG. 2a. However, it has been shown empirically that the length of exposed conductive support (or electrode) above and below the transmitter $T_x$ should be proportional to the diameter of the borehole to the 3/2 power.

In FIG. 2a most of the current density $\vec{J}$ is observed to return before $B_x$, but some of the current will continue past $B_x$ if the conductive support length is less than the diameter of the borehole to the 3/2 power. This axial current will excite an azimuthal magnetic field that will couple to the bucking antenna $B_x$ by Ampere's law and add to the formation response of the TMD array. This eccentered effect is not desired.

It is desirable to have antenna arrays with as small as possible transmitter-receiver spacings, where the bucking antenna lies between the transmitter and the receiver. The necessary length needed for the exposed metal (electrode) between the transmitter and the nearest bucking antenna to short the induced axial current is diametrically opposed to the desire for a small array spacing. There is typically much insulating material between the transmitter and the adjacent metal sections of conventional logging tools due to the mechanical structure of the tool and the demand that the sections isolating the antennas from the mud be electromagnetically transparent. It is possible to regain this lost insulated length covering the TMDs for the shorting of the undesired axial currents. This can be achieved by orienting isolated strips of electrically conductive materials to short the undesired axial current along paths perpendicular to the electric field lines of a TMD antenna, which cannot couple to the magnetic dipoles.

Figure 2B:
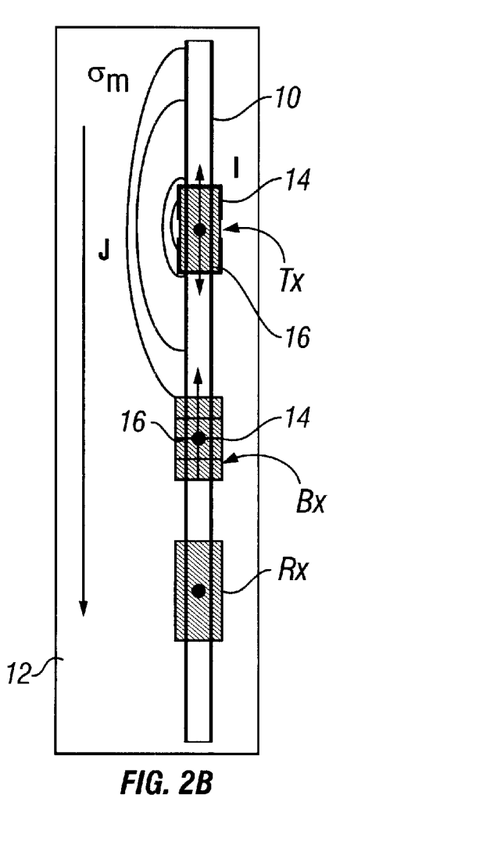
FIG. 2b shows the logging instrument of FIG. 2a implemented with the shielding bodies in accord with the invention.

FIG. 2b shows the support 10 of FIG. 2a equipped with an embodiment of the invention. The transmitter $T_x$ is covered by an insulating body 14 embedded with electrically conductive elements 16. According to this embodiment, the elements 16 are axially oriented. The elements 16 are in contact with the mud 12 and grounded to the conductive support 10 as described below. In essence, the body 14 shields and effectively changes the length of the passive electrode (i.e. conductive support length) between the $T_x$ and $B_x$. A similar type body 14 is located over the bucking antenna $B_x$, where the conductive elements run azimuthally over the TMD antenna and are then shorted into the conductive support 10 as described below.

Figure 3:
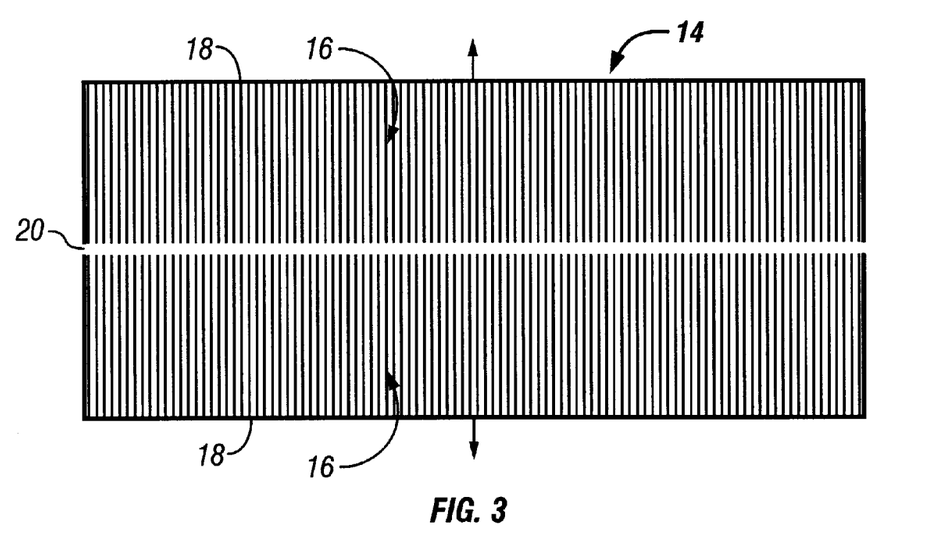
FIG. 3 is a schematic diagram of a conductive element pattern on a shielding body in accord with the invention and projected unto a two-dimensional surface.

FIG. 3 shows an embodiment of the invention. The cylindrical body 14 surrounding the $T_x$ in FIG. 2b is shown as an unwrapped sheet, i.e., projected onto a two-dimensional surface. In addition to $T_x$, the body 14 may also be disposed about a $B_x$ or $R_x$ antenna. The body 14 can be any electrically nonconductive or dielectric film substrate, such as polyimide film or a polyester film having a thickness selected to enable bending or flexing. Methods used to produce the insulating sheet are described in U.S. Pat. No. 6,208,031, incorporated by reference. U.S. Pat. No. 6,351,127 (assigned to the present assignee) also describes shielding structures incorporating nonconductive strips.

Conductive elements 16 are affixed to the body 14. The elements 16 can be any suitable electrical conductor, including wire or metallic strips/foil. Alternatively, the elements may be formed by the deposition of conductive films on the body 14 as known in the art. Adhesives (e.g. polyimides, epoxies, and acrylics) may be used to bond the elements 16 to the body. The effects of thermal expansion may be reduced by choosing conductive elements 16 with a coefficient of expansion near to that of the body 14.

One series of elements 16 extends from a first (upper) end and another series extends from a second (lower) end. The elements 16 are in parallel to one another in alignment with the longitudinal axis of the body 14. Independent elements are used to form conductors 18 which respectively connect each series of elements at the first and second ends. A spacing or gap 20 separates the elements 16 extending from their respective ends.

Figure 4:
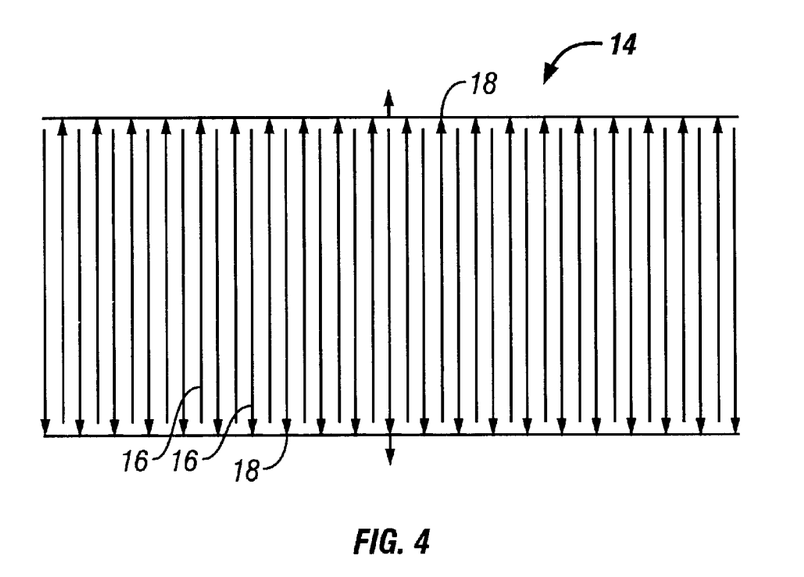
FIG. 4 is a schematic diagram of a conductive element pattern on a shielding body in accord with the invention and projected unto a two-dimensional surface.

FIG. 4 shows another conductive element 16 pattern according to an embodiment of the invention. In this embodiment, the elements 16 are also connected to independent conductors 18 at the first and second ends. However, the elements now extend from their respective ends past one another along the body 14. The elements 16 do not make contact with the opposing end. This body 14 may also be disposed about $T_x$, $B_x$, or $R_x$.

Figure 5:
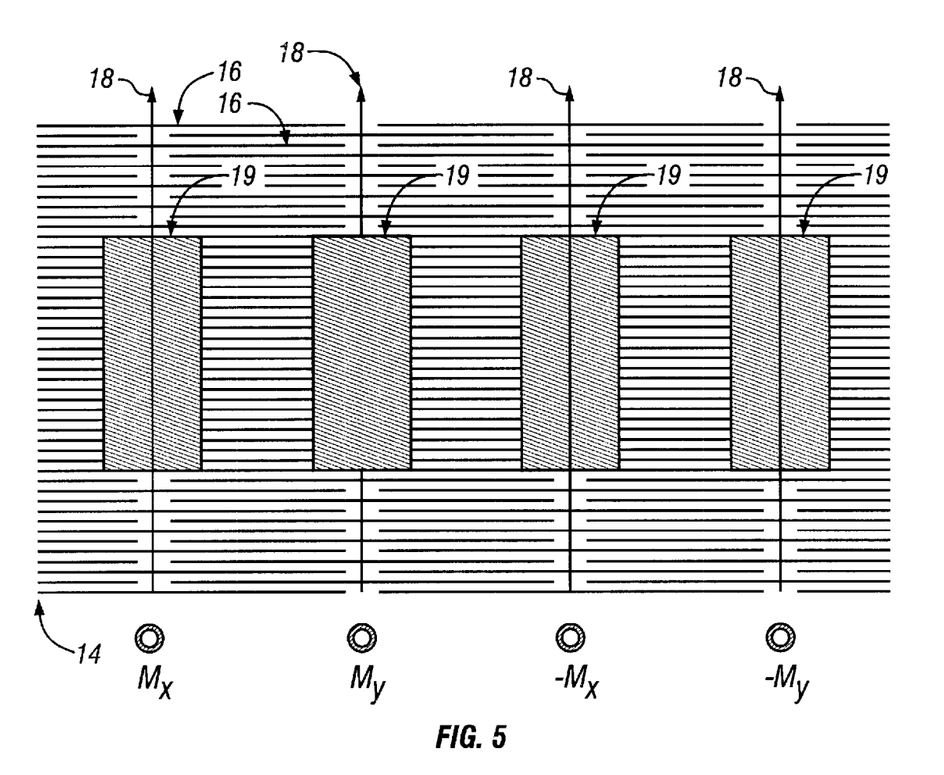
FIG. 5 is a schematic diagram of a conductive element pattern on a shielding body in accord with the invention and projected unto a two-dimensional surface.

FIG. 5 shows an embodiment of the invention. In this embodiment, the body 14 is again shown in an unwrapped representation. However, the body 14 is shown unwrapped over an x- and y-receiver, representative of the underlying saddle-coil antennas 19. The respective magnetic moments $M_x$, $M_y$ extend out of the figure. This embodiment may also be used over a transmitter $T_x$, receiver $R_x$, or bucking $B_x$, antenna to short the current missed by the body 14 shielding the transmitter and the conductive support section forming the passive electrode. Residual axial current shown in FIG. 1a shorts into the azimuthal conductive elements 16 leading back to the center of the underlying saddle coil 19 shown in FIG. 1b. Once on the body 14, the current is redirected away from the underlying saddle coil 19 and allowed to flow axially toward the transmitter $T_x$. The current continues its circuit path axially underneath the transmitter and out the far passive electrode above $T_x$ and out into the mud. The body 14 of this embodiment also incorporates conductors 18 to connect the elements 16.

Figure 6:
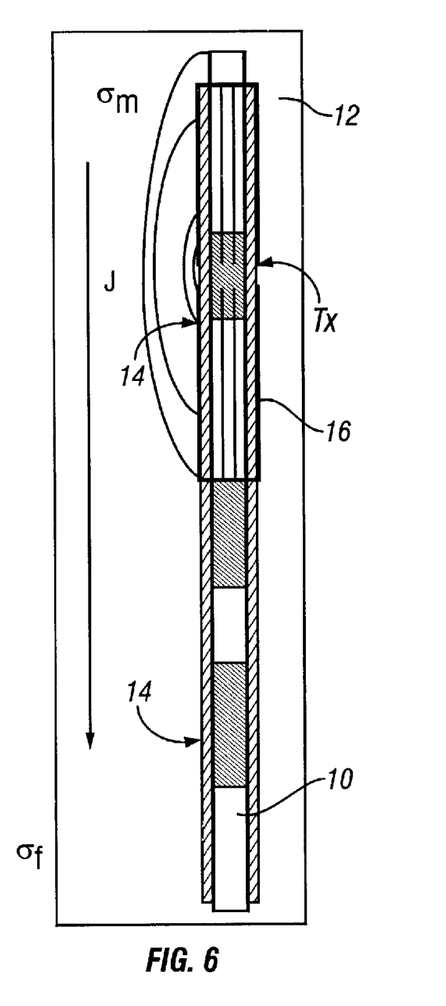
FIG. 6 is a schematic diagram of a logging instrument implemented with a shielding body in accord with the invention.

FIG. 6 shows an embodiment of the invention. The body 14 is now shown wrapped around the support 10 to cover transmitter $T_x$. According to this embodiment, the body 14 is extended in length, forming a sleeve to replace the electrode formed by the conductive support 10. Such a sleeve may be used with non-conductive supports to short the unwanted TMD borehole effect. It will be appreciated by those skilled in the art that multiple element 16 patterns may be used to shield multiple antennas on the support 10 using this extended body 14 design.

In operation, undesired axial currents are shorted to the conductive elements 16, which are connected to the conductors 18 along the entire circumference of the body 14. The current path is formed via a connection along the support 10 (described below) back to the body 14 and out to the mud to complete the circuit. The body 14 itself has no complete circuit paths for which eddy currents can be generated within.

Figure 7A:
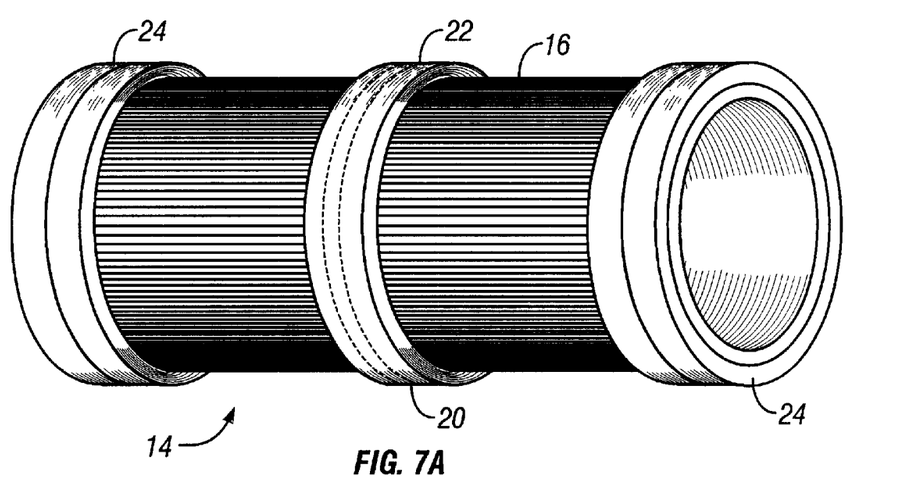
FIG. 7a is a schematic diagram of a shield body in accord with the invention.

FIG. 7a shows another embodiment of the invention. A cylindrical non-conductive surface of revolution or body 14 is implemented with conductive elements 16 to form a sleeve. The body 14 may be formed of any suitable dielectric or composite material as known in the art. Usable materials or composites include, for example, a commercially available material known in the trade as Randolite, or polyaryletherketone-based thermoplastic materials as described in U.S. Pat. Nos. 6,084,052 and 6,300,762 (both assigned to the present assignee). The elements 16 may e any suitable electrical conductor such as described above. The conductive elements 16 may be affixed to surface of the body as described above.

Figure 7B:
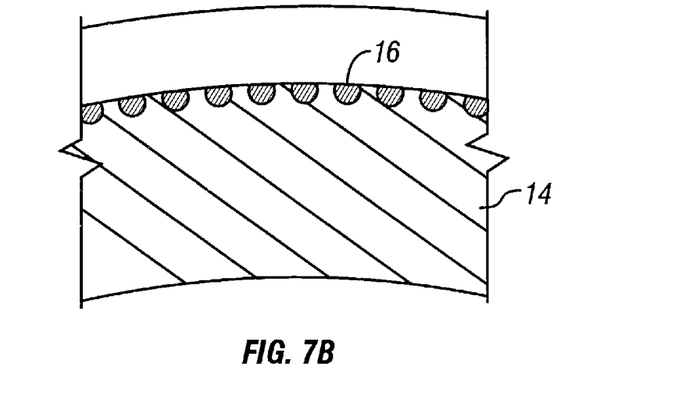

In one embodiment, the elements 16 are embedded or assembled into the body 14 in such a way so that they are mechanically bonded to the body. FIG. 7b shows the elements 16 embedded within the body 14. The elements 16 (e.g. wires) are embedded slightly below the centerline to ensure a mechanical bond. The extent or thickness of the conductive element 16 cross-section, i.e., dimension, is preferably less than or equal to a skin depth.

As shown in FIG. 7a, one series of elements 16 extends from a first end of the body 14 and another series extends from the opposing second end. The elements 16 are in parallel to one another in alignment with the longitudinal axis of the body 14. The elements 16 extend from their respective ends toward the centerline of the body 14. A gap 20 is left between the elements 16, similar to the embodiment of FIG. 3. Non-conductive strips or bands 22 may be placed over the elements 16 to protect the elements from the rigors of the borehole environment. The bands 22 may be formed of the same material as the body 14 or any other suitable material.

The body 14 is joined to a metallic sleeve or band 24 at its ends. The metallic bands 24 are electrically coupled with the elements 16 to provide a current path and to extend the electrode surface along the support 10 axis when the body is disposed on the support.

Figure 8:
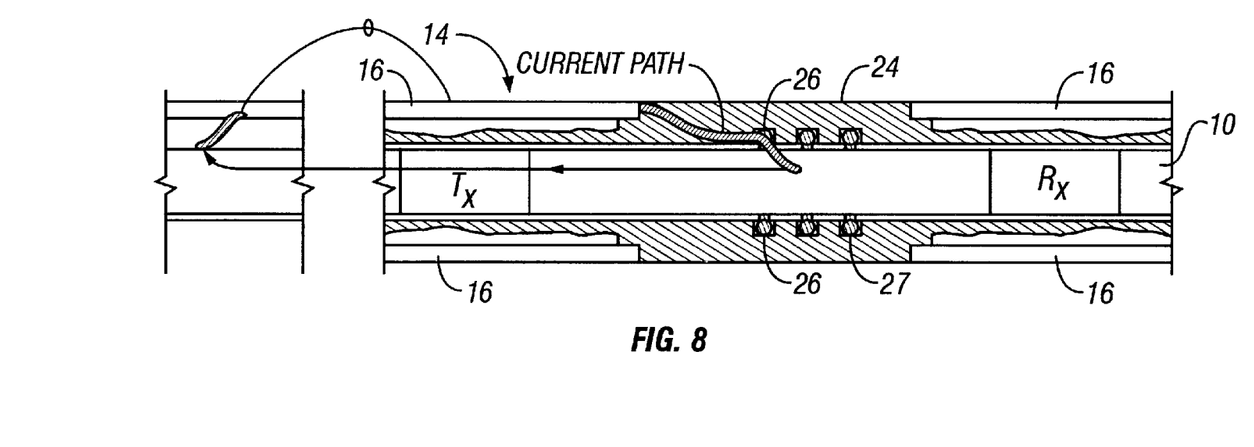
FIG. 8 is a schematic diagram of a shielding body configuration in accord with the invention.

FIG. 8 shows an embodiment of the invention. A conductive support 10 is fitted with the body 14 to shield the transmitter $T_x$ and receiver $R_x$. An electrical conductor 26 is disposed within the band 24 to make contact with the housed support 10, thereby providing a current path from the elements 16 to the support. Any suitable electrical conductor 26 may be used. For example, a wire or a spring may be fastened to the body 14 to make contact with the support 10 (not shown). According to this embodiment, the conductor 26 consists of a metal-covered o-ring disposed within an azimuthal recess 27 along the I.D. of the band 24. By connecting several bodies 14 together, this sleeve structure can be made to extend to any desired length along the support.

Figure 9:
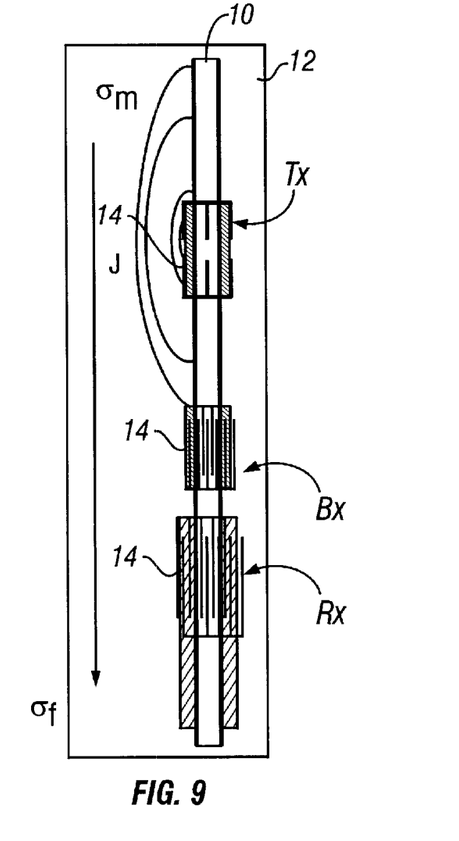
FIG. 9 is a schematic diagram of a logging instrument implemented with a shielding body in accord with the invention.

The metallic band 24 may be joined to the body 14 and held in place using a suitable adhesive or fastener (e.g. screws, clamps, etc.). The band 24 or the body 14 may also be configured such that one will fit within the other to form a joint (not shown). Alternatively, the band 24 may consist of metallic sections affixed to the exterior of a one-piece dielectric body 14 to form a segmented azimuthal conductor (not shown). Those skilled in the art will appreciate that the conductive band 24 may be attached to the body 14 in various fashions, what matters is that the desired current path is established between the elements 16 and the support 10. The body 14 configurations of the invention may be retained from axial movement along the support 10 in any manner known in the art. The bodies 14 may also be interchanged and combined as desired to shield the antenna arrays, as shown in FIG. 9. However, some coupling to the underling TMD antenna may occur with some configurations.

Figures 10, 12:
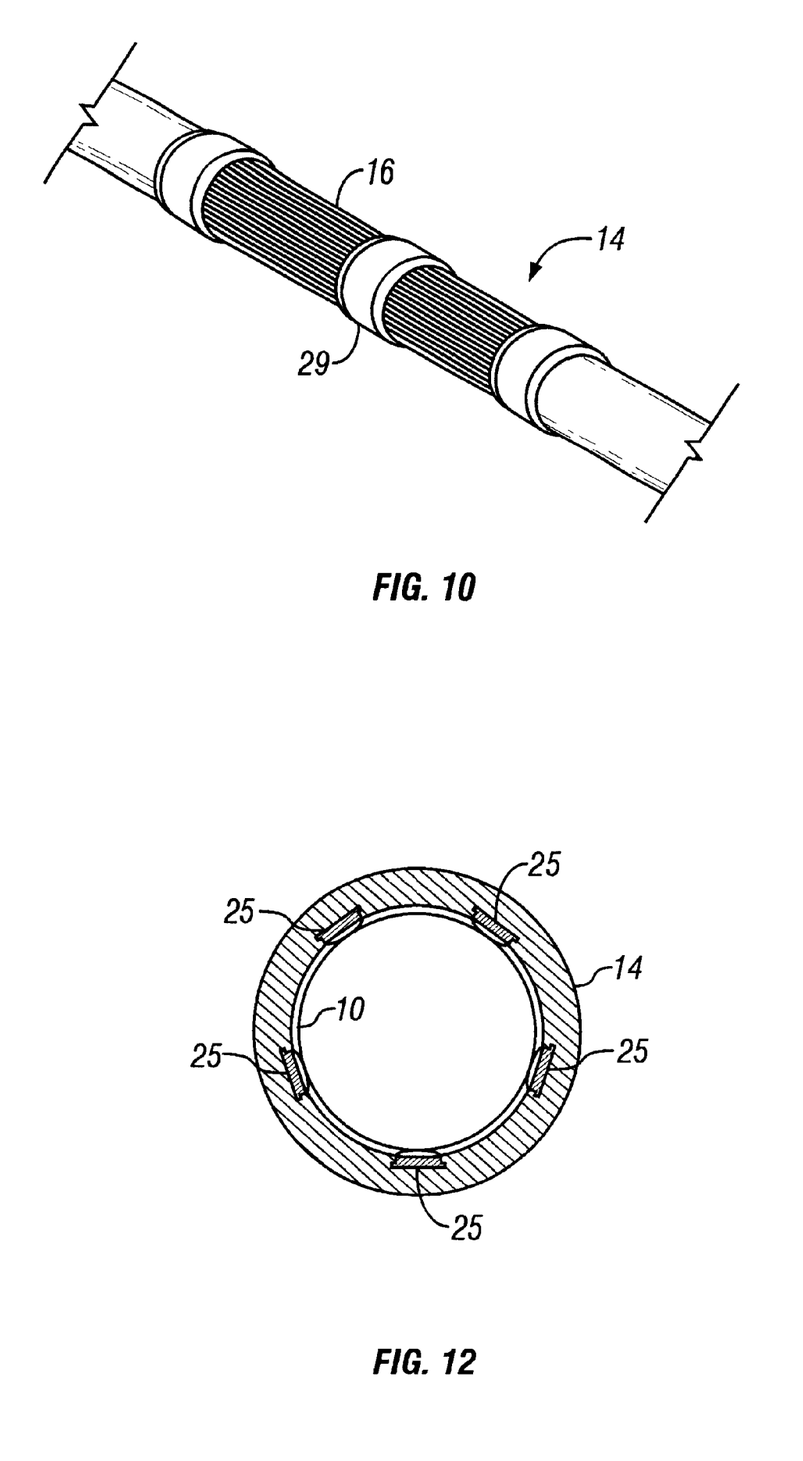
FIG. 10 is a schematic diagram of a shield body in accord with the invention.
FIG. 12 is a cross-section of the shield body of FIGS. 10 and 11.

FIG. 10 shows another embodiment of the invention. A one-piece body 14 is formed of the dielectric material to form an elongated sleeve. The conductive elements 16 are inlaid within the composite body 14 as described herein such that they are exposed for contact with the borehole mud. According to this embodiment, one or more conductive "buttons" 25 or plugs are embedded within the body 14 to reach the I.D. of the body (shown in FIG. 11). The buttons 25 may be any conductive material, preferably metal. The elements 16 are affixed to the body 14 such that they are electrically coupled to a button 25, extending therefrom in opposite directions.

Figure 11:
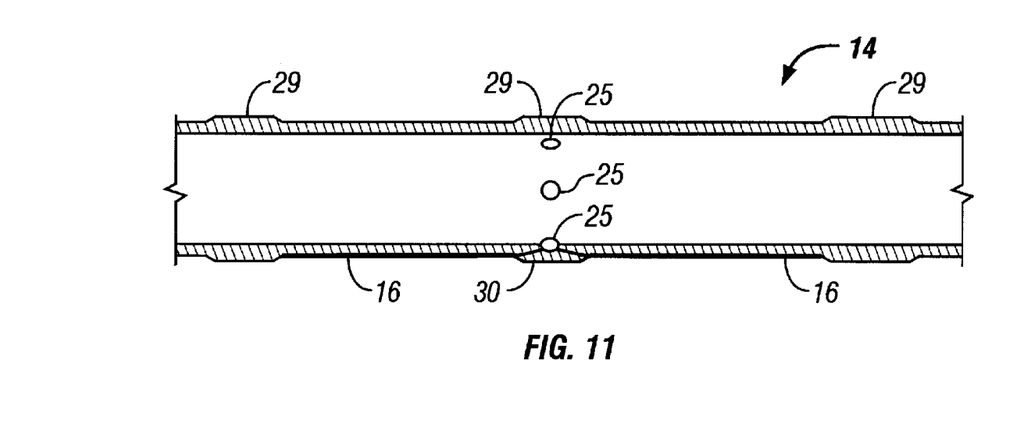
FIG. 11 is a schematic diagram of the shield body of FIG. 10.

As shown in FIGS. 10 and 11, the composite body 14 may be configured with a protective wear band 29 to seal and house the element 16 junction with the button(s). Additional wear bands 29 may be configured into the body 14 by overlaying the composite material as known in the art. In this fashion, the elements 16 may be sealed within "pockets" at their terminating ends for greater stability. The electrical coupling between a button 25 and element 16 may also be reinforced by using braided wire 30 to connect the element 16 to the button 25. The braided wire 30 provides added flexibility to ensure a reliable electrical link during thermal expansion.

FIG. 12 shows a cross-section of the body 14 in place over a support 10. The buttons 25 may be configured such they extend into the I.D. to make direct contact with the O.D. of the support. In one embodiment, the buttons 25 may be spring-loaded with rounded tips, e.g., ball bearings (not shown). Alternatively, the buttons 25 may have a wire or other suitable conductor attached to extend into the I.D. for contact with the support 10 (not shown). The one-piece composite body 14 may be formed to extend to the desired axial length, with multiple button/element stations.

Those skilled in the art will appreciate that the shielding body 14 structures of the invention are not limited to use in any one particular type of measurement or exploration operation, and that they may be disposed within a borehole on any type of support member, e.g., on coiled tubing, drill collars, or wireline tools.

Figure 13:
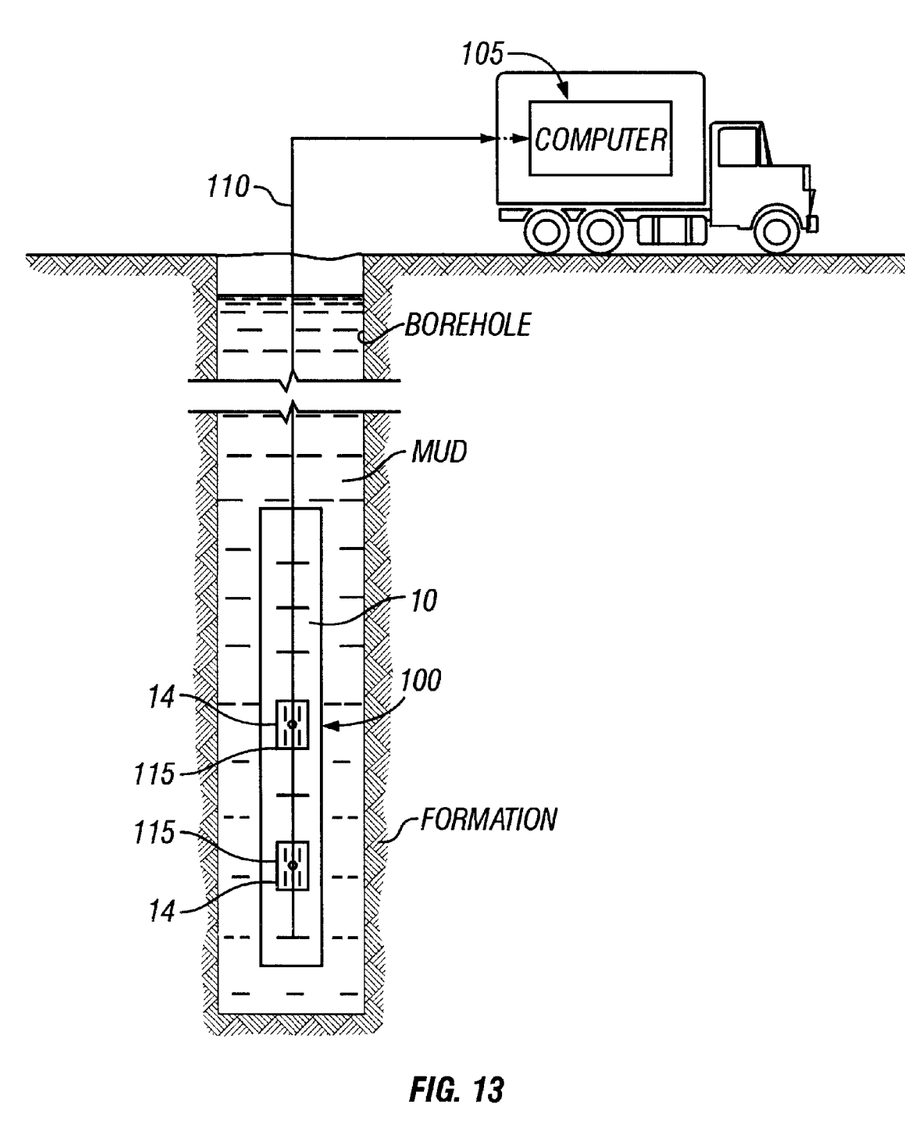
FIG. 13 is a schematic diagram of a wireline logging instrument implemented with a shielding body in accord with the invention.

FIG. 13 shows a logging instrument 100 according to an embodiment of the invention. The instrument 100 consists of an elongated support 10 adapted for disposal through the borehole and coupled to a surface computer 105 by a wireline cable 110. An antenna array 115 ($T_x$, $B_x$, or $R_x$) is mounted on the support. A body 14 of the invention is disposed over the antennas to redirect undesired axial currents as disclosed herein. As known in the art, a profile of the formation characteristics can be determined in real-time by sending measured signal data to the surface as they are acquired, or it can be determined from a recorded-mode by recording the data on a suitable recordable medium (not shown) housed within the instrument 100. As known in the art, the signal data are typically transmitted from the instrument 100 to the surface computer 105 by electronics (not shown) housed in the instrument 100. The signal data may be sent to the surface computer along the wireline cable or by alternate telemetry means. Once received by the surface computer 105, the data can be recorded, processed, or computed as desired by the user to generate a formation profile. The profile can then be recorded on a suitable output record medium. Alternatively, some or all of the processing can be performed downhole and the data can be recorded uphole, downhole, or both.

Figure 14:
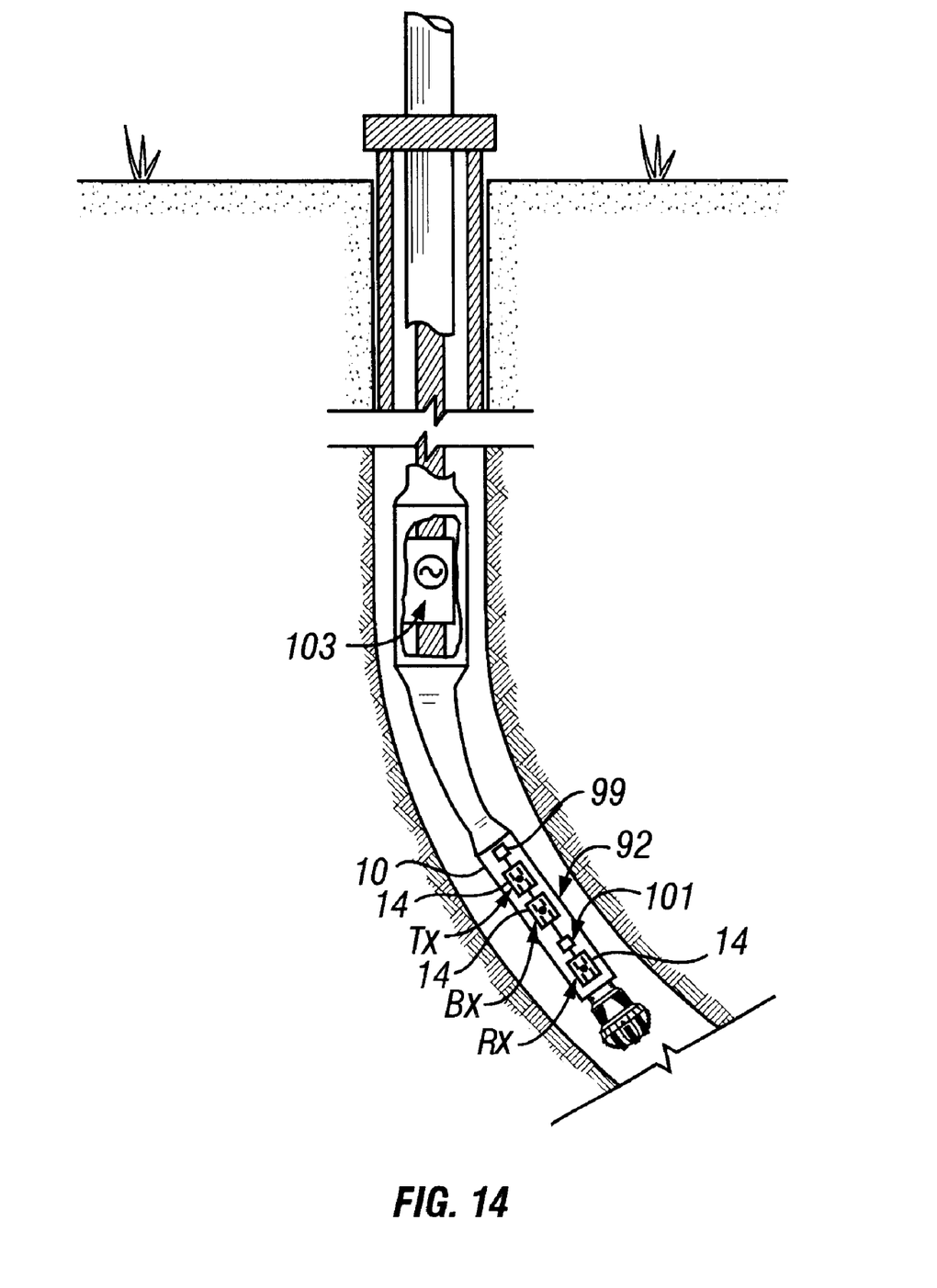
FIG. 14 is a schematic diagram of a while-drilling logging instrument implemented with a shielding body in accord with the invention.

FIG. 14 shows a logging instrument 92 according to another embodiment of the invention. The instrument 92 consists of an elongated support 10 adapted for disposal through the borehole on a drill string 93. The instrument is equipped with a transmitter antenna $T_x$, a bucking antenna $B_x$, and a receiver antenna $R_x$. A body 14 of the invention is disposed over the antennas to redirect undesired axial currents as disclosed herein. Transmitter electronic circuitry 99 is connected to the transmitter antenna $T_x$ to provide time-varying electric currents to induce time-varying magnetic fields. Power supply 103 feeds the circuitry 99. Receiver circuitry 101 is connected to the receiver antenna $R_x$ to detect and measure resulting signal data.

For the purposes of this specification it will be clearly understood that the word "comprising" means "including but not limited to", and that the word "comprises" has a corresponding meaning. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for use with a support adapted for disposal within a borehole, comprising:
    a body adapted for disposal on said support, said body having a longitudinal axis, first and second ends, and formed of a dielectric material;
    at least one electrically conductive element disposed on said body in alignment with the longitudinal axis, the element extending from the first end and terminating between said first and second ends; and
    a conductor coupled to the at least one electrically conductive element to provide a current path between said element and said support.

2. The apparatus as defined in claim 1, wherein the at least one electrically conductive element comprises one of a metallic strip, a wire, or a deposited conductive film.

3. The apparatus as defined in claim 1, further comprising:
    at least one electrically conductive element disposed on said body in alignment with the longitudinal axis, the element extending from the second end and terminating between said first and second ends; and
    a conductor coupled to the at least one conductive element extending from said second end to provide a current path between said element and said support.

4. The apparatus as defined in claim 3, wherein the at least one electrically conductive element extending from the second end comprises one of a metallic strip, a wire, or a deposited conductive film.

5. The apparatus as defined in claim 3, wherein said at least one electrically conductive element extending from the first end and said at least one electrically conductive element extending from the second end do not extend beyond one another.

6. The apparatus as defined in claim 3, wherein said at least one electrically conductive element extending from the first end and said at least one electrically conductive element extending from the second end extend past one another without contacting the opposite end of said body.

7. The apparatus as defined in claim 1, wherein said body is generally flexible and adapted to wrap around said support.

8. The apparatus as defined in claim 1, wherein said body comprises a plurality of electrically conductive elements disposed thereon such that each element extends from the first end and terminates between said first and second ends, said elements being parallel to one another and coupled to said conductor to provide a current path between said elements and said support.

9. The apparatus as defined in claim 8, wherein said body comprises a plurality or electrically conductive elements disposed thereon such that each element extends from the second end and terminates between said first and second ends, said elements being parallel to one another and coupled to a conductor to provide a current path between said elements and said support.

10. The apparatus as defined in claim 1, wherein said body is generally in the shape of a surface of revolution.

11. The apparatus as defined in claim 10, wherein said surface of revolution is hollow and open-ended.

12. The apparatus as defined in claim 11, wherein said at least one electrically conductive element is joined to a metallic band at the first end of said body, the band adapted for disposal on said support.

13. The apparatus as defined in claim 12, wherein said conductor coupled to the at least one electrically conductive element is connected to said metallic band to provide a current path between said element and said support.

14. The apparatus as defined in claim 13, said body further comprising a band disposed over the at least one conductive element and surrounding said body, said band formed of a dielectric material.

15. The apparatus as defined in claim 11, further comprising:
    at least one electrically conductive element disposed on said body in alignment with the longitudinal axis, the element extending from the second end and terminating between said first and second ends; and
    a conductor coupled to the at least one conductive element extending from said second end to provide a current path between said element and said support.

16. The apparatus as defined in claim 15, wherein die at least one electrically conductive element extending from the second end comprises one of a metallic strip, a wire, or a deposited conductive film.

17. The apparatus as defined in claim 15, wherein said at least one electrically conductive element extending from the first end and said at least one electrically conductive element extending from the second end do not extend beyond one another.

18. The apparatus as defined in claim 15, wherein said at least one electrically conductive element extending from the first end and said at least one electrically conductive element extending from the second end extend past one another without contacting the opposite end of said body.

19. The apparatus as defined in claim 11, wherein said body comprises a plurality of electrically conductive elements disposed thereon such that each element extends from the first end and terminates between said first and second ends, said elements being parallel to one another and coupled to said conductor to provide a current path between said elements and said support.

20. The apparatus as defined in claim 19, wherein said body comprises a plurality of electrically conductive elements disposed thereon such that each element extends from the second end and terminates between said first and second ends, said elements being parallel to one another and coupled to a conductor to provide a current path between said elements and said support.

21. The apparatus as defined in claim 20, said body further comprising a band disposed over said conductive elements and surrounding said body, said band formed of a dielectric material.

22. The apparatus as defined in claim 20, wherein said plurality of conductive elements extending from the first end of said body are joined to a metallic band at said first end, the band adapted for disposal on said support.

23. The apparatus as defined in claim 22, wherein said plurality of conductive elements extending from the second end of said body are joined to a metallic band at said second end, the band adapted for disposal on said support.

24. The apparatus as defined in claim 23, said body further comprising a band disposed over said conductive elements between said first and second ends, said band formed of a dielectric material and adapted to surround said body.

25. An apparatus for use with a support adapted for disposal within a borehole, comprising:
    a body adapted for disposal on said support, said body having a longitudinal axis, first and second sides, and formed of a dielectric material;
    at least one conductor disposed on said body in alignment with the longitudinal axis;
    at least one electrically conductive element disposed on said body in contact with and intersecting said at least one conductor; and said at least one conductive element extending out in opposite directions from the intersection with said at least one conductor to terminate unconnected in each direction;

wherein said at least one conductor is adapted to provide a current path between said at least one conductive element and said support.

26. The apparatus as defined in claim 25, wherein the at least one electrically conductive element and the at least one conductor each comprises one of a metallic strip, a wire, or a deposited conductive film.

27. The apparatus as defined in claim 25, wherein said body is generally flexible and adapted to wrap around said support.

28. The apparatus as defined in claim 25, wherein said body comprises a plurality of electrically conductive elements disposed thereon such that each element is in contact with and intersects said at least one conductor.

29. The apparatus as defined in claim 28, wherein the elements of said plurality of elements are parallel to one another and terminate unconnected.

30. The apparatus as defined in claim 25, wherein said body comprises:

a plurality of conductors disposed thereon, said conductors in alignment with the longitudinal axis of said body; and each said conductor intersecting and in contact with a plurality of electrically conductive elements disposed on said body;

wherein the plurality of elements in contact with one conductor are independent from the plurality of elements in contact with another conductor.

31. An apparatus for use with a support adapted for disposal within a borehole, comprising:

a body adapted for disposal on said support, said body formed of a dielectric material as a hollow open-ended surface of revolution with first and second ends;

at least one electrical conductor disposed on said body; and at least one electrically conductive element disposed on said body in alignment with the longitudinal axis of the body, the element electrically coupled to the at least one conductor and extending toward said first end to terminate unconnected;

wherein said at least one conductor is adapted to provide a current path between said at least one element and said support.

32. The apparatus as defined in claim 31, wherein said at least one conductor is embedded within said body at a point between said first and second ends.

33. The apparatus as defined in claim 32, further comprising a second electrically conductive element disposed on said body in alignment with the longitudinal axis, the element electrically coupled to the at least one conductor and extending toward said second end to terminate unconnected.

34. The apparatus as defined in claim 33, wherein said at least one conductor comprises a button joined with a wire, said wire contacting said conductive elements.

35. The apparatus as defined in claim 34, wherein said button extends to the inside diameter of said body to provide a current path between said elements and said support.

36. The apparatus as defined in claim 35, said body further comprising a band disposed over said at least one conductor and surrounding said body, said band formed of a dielectric material.

37. The apparatus as defined in claim 36, wherein said electrically conductive elements each comprise one of a metallic strip, a wire, or a deposited conductive film.

38. The apparatus as defined in claim 31, wherein said body comprises:

a plurality of electrical conductors disposed thereon; and a plurality of electrically conductive elements disposed thereon in alignment with the longitudinal axis of the body, said elements electrically coupled to individual conductors of said plurality of conductors and extending toward said first end to terminate unconnected.

39. The apparatus as defined in claim 38, said body further comprising a plurality of electrically conductive elements disposed thereon in alignment with the longitudinal axis of the body, said elements electrically coupled to individual conductors of said plurality of conductors and extending toward said second end to terminate unconnected.

* * * * *